United States Patent [19]

Habermeier et al.

[11] 4,108,841
[45] Aug. 22, 1978

[54] THERMOPLASTIC POLYESTERS AND PROCESSES FOR THEIR MANUFACTURE

[75] Inventors: Jürgen Habermeier, Pfeffingen, Switzerland; Lothar Buxbaum, Lindenfels, Odenwald, Fed. Rep. of Germany

[73] Assignee: Ciba-Geigy Corporation, Ardsley, N.Y.

[21] Appl. No.: 795,350

[22] Filed: May 9, 1977

[30] Foreign Application Priority Data

May 12, 1976 [CH] Switzerland .................. 5934/76

[51] Int. Cl.² .............................................. C08G 63/68
[52] U.S. Cl. .................................................... 528/289
[58] Field of Search ...................................... 260/75 N

[56] References Cited

U.S. PATENT DOCUMENTS

| 3,856,754 | 12/1974 | Habermeier et al. | 260/75 N |
| 3,860,564 | 1/1975 | Habermeier et al. | 260/75 N |
| 3,985,711 | 12/1976 | Cohen et al. | 260/75 N |
| 3,997,510 | 12/1976 | Habermeier | 260/75 N |
| 4,038,255 | 7/1977 | Habermeier | 260/75 N |

Primary Examiner—Lucille M. Phynes
Attorney, Agent, or Firm—Luther A. R. Hall

[57] ABSTRACT

Thermoplastic polyesters which are more stable to heat and have good properties in use and during processing are obtained with dicarboxylic acids containing N,N-heterocyclic rings when the alkylene group which bonds the carboxyl groups to the N atoms contains at least 3 C atoms.

14 Claims, No Drawings

THERMOPLASTIC POLYESTERS AND PROCESSES FOR THEIR MANUFACTURE

The present invention relates to linear thermoplastic polyesters obtained from dicarboxylic acids which contain a N,N-heterocyclic ring, and optionally further aliphatic and/or aromatic dicarboxylic acids, and aliphatic or cycloaliphatic diols and to processes for their manufacture by a polycondensation reaction.

Dicarboxylic acids which contain a N,N-heterocyclic radical in the molecule and the general proposal for their use for the manufacture of polyesters are already known. Thus, the manufacture of dicarboxylic acids which contain hydantoin and alkylene-bis-hydantoins by cyanoethylation of hydantoin and alkylene-bis-hydantoins and subsequent hydrolysis of the resulting cyanoethyl compounds to dicarboxylic acids is described in "Chemical Abstracts", Vol. 59, page 3907(e).

Furthermore, aliphatic dicarboxylic acids which contain a N,N-heterocyclic radical and have a methylene or ethylene group in the alkylene chain, and the dialkyl esters thereof, are known from DT-OS 2,453,326. These dicarboxylic acids do not have an adequately high stability to heat and are therefore not very suitable for the manufacture of polyesters, for example by the melt condensation process, since they are able to redissociate into hydantoin and acrylic compound. The polyesters manufactured from the abovementioned dicarboxylic acids are therefore frequently contaminated with undesired by-products. Furthermore, in the polyester, these dicarboxylic acids effect an increase in the glass transition temperature, which is not desired for many applications, especially when the aim is to obtain more flexible products.

Furthermore, in DT-OS 1,906,492 and DT-OS 2,358,437, the manufacture of oligo- and poly-hydantoins containing carboxylic acid groups by reacting polyglycine esters with isocyanates containing carboxylic acid groups is described and a general proposal is made for the further use of these compounds for the manufacture of polymers. These manufacturing processes on the one hand are subject to the disadvantage that the starting materials necessary for these processes are obtained only by means of expensive syntheses and the reaction of the polyglycine esters with the isocyanates, which proceeds with cyclisation, requires relatively high temperatures and, moreover, the desired substances can be separated off from products in which cyclisation is not quantitative, in the reaction mixture, only with difficulty or incompletely and as a result of this the polymers manufactured therefrom also contain undesired by-products. On the other hand, because of the lack of a corresponding polyglycine ester it is not possible to manufacture 1,1'-methylene-bis-hydantoins which contain carboxylic acid groups by the processes described in the two German Offenlegungsschriften.

The object of the present invention is to provide, more economically, thermoplastic polyesters from virtually pure dicarboxylic acids which contain a N,N-heterocyclic ring and can be manufactured easily and are more stable to heat. A further object of the present invention is to provide modified copolyesters in which, due to the incorporation of a monomer containing a N,N-heterocyclic ring, the glass transition temperature of the polyester is only slightly reduced or remains the same, the mechanical properties of the copolyester and its properties during processing are only slightly changed or are changed in a desirable manner and the notched impact strength is improved.

The present invention relates to linear thermoplastic polyesters, obtained from aromatic and aliphatic dicarboxylic acids and diols, which have a relative viscosity of 1.2 to 3.5, measured at 30° C in a solution of 1 g of polyester in 100 ml of a solvent which consists of equal parts of phenol and symmetrical tetrachloroethane, which contain, relative to the polyester, (a) 0 to 49.5 mol % of radicals of at least one aliphatic, cycloaliphatic and/or aromatic dicarboxylic acid, (b) 50 to 0.5 mol % of radicals of at least one dicarboxylic acid of the general formula I

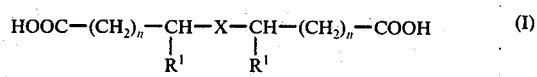

in which the two $R^1$ independently of one another each denote a hydrogen atom or alkyl with 1 to 12 C atoms, n represents identical or different numbers from 0 to 12, the C content of the $(CH_2)_n$ and $R^1$ groups together being at least 2, and X denotes a N,N-heterocyclic radical of the formulae IIa to IIf

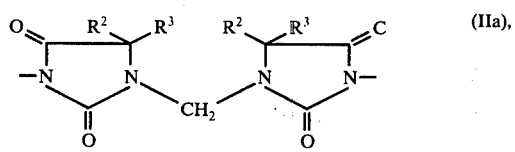

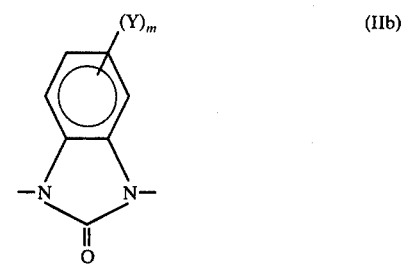

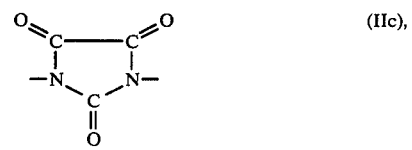

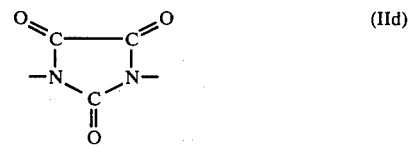

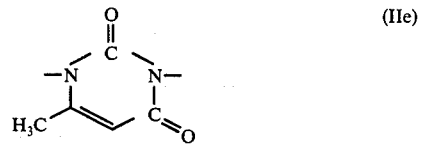

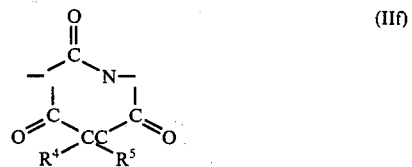

in which $R^2$ represents a hydrogen atom or the methyl or ethyl group and $R^3$ represents the methyl, ethyl, propyl or isopropyl group, $R^4$ and $R^5$ each denote the methyl, ethyl or phenyl group, Y represents a bromine atom or chlorine atom and m is nought or denotes a number from 1 to 4, and (c) 50 mol % of radicals of at least one aliphatic or cycloaliphatic diol, as cocondensed radicals.

Preferably, the polyesters contain 1 to 49.5 mol % of aliphatic and/or aromatic dicarboxylic acid radicals and 49 to 0.5 mol % of radicals of dicarboxylic acids of the formula I.

Suitable dicarboxylic acids are linear and branched saturated aliphatic dicarboxylic acids, aromatic dicarboxylic acids and cycloaliphatic dicarboxylic acids.

Examples of aliphatic dicarboxylic acids which can be used are: malonic acid, dimethylmalonic acid, succinic acid, octadecylsuccinic acid, pimelic acid, adipic acid, trimethyladipic acid, sebacic acid, azelaic acid and dimeric acids (dimerisation products of unsaturated aliphatic carboxylic acids such as oleic acid).

Cycloaliphatic dicarboxylic acids which can be used are: 1,3-cyclobutanedicarboxylic acid, 1,3-cyclopentanedicarboxylic acid, 1,3- and 1,4-cyclohexanedicarboxylic acid, 1,3- and 1,4-dicarboxymethylcyclohexane and 4,4'-dicyclohexyldicarboxylic acid.

Suitable aromatic dicarboxylic acids which can be used are: terephthalic acid, isophthalic acid, o-phthalic acid, 1,3-, 1,4-, 2,6- or 2,7-naphthalenedicarboxylic acids, 4,4'-diphenyldicarboxylic acid, 4,4'-diphenylsulphone-dicarboxylic acid, 1,1,3-trimethyl-5-carboxy-3-(p-carboxyphenyl)-indane, 4,4'-diphenyl ether-dicarboxylic acid and bis-p-(carboxyphenyl)-methane.

The aromatic dicarboxylic acids are preferred and amongst these terephthalic acid is particularly preferred.

A preferred group of the polyesters according to the invention is that in which the radicals of the dicarboxylic acids of component (a) consist to the extent of at least 85 mol % preferably only of aromatic dicarboxylic acids radicals, relative to the dicarboxylic acid radicals present in component a). Amongst the aromatic dicarboxylic acids, isophthalic acid and in particular terephthalic acid are preferred.

The copolyesters which contain 30 to 49, and preferably 40 to 48, mol % of dicarboxylic acid radicals of component (a) and 20 to 1, and preferably 10 to 2, mol % of dicarboxylic acid radicals of the formula I are a further preferred group.

Suitable diols having aliphatic alcohol groups are the aliphatic glycols, especially those with 2 to 10 carbon atoms in the molecule, cycloaliphatic and cycloaliphatic-aliphatic diols, such as 1,4-dihydroxycyclohexane and 1,4-dihydroxymethylcyclohexane, aromatic-aliphatic diols, such as p-xylylene glycol or 2,5-dichloro-p-xylylene glycol, or a polyoxaalkylene glycol, such as diethylene glycol, triethylene glycol or polyethylene glycol. The akylene diols are preferably linear and contain, in particular, 2 to 4 carbon atoms. Preferred diols are the alkylenediols, 1,4-dihydroxycyclohexane and 1,4-dihydroxymethylcyclohexane. Ethylene glycol and 1,4-butanediol are particularly preferred. Further preferred diols are those of the formula

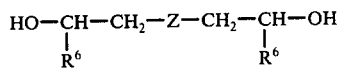

in which $R^6$ denotes methyl, ethyl and, in particular, a hydrogen atom and Z represents a radical of the formulae IIa or IIb or represents a hydantoin radical of the formula IIg

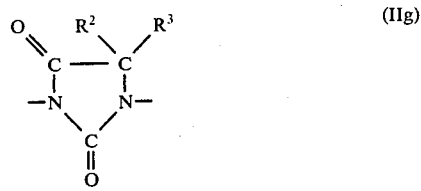

in which $R^2$, $R^3$, Y and m have the meaning previously indicated. These known diols are described, for example, in DT-OS No. 2,453,448.

The polyesters can be synthesised from a single aliphatic diol or from different aliphatic diols. When several diols are used, preferably at least 40 mol % of the total content consists of a diol radical of one type only. Particularly preferentially, at least 40 mol % of the total content consists in particular of linear alkylene diol radicals only.

In formula I, n preferably represents the numbers 2 to 12. If $n$ is 0 or 1, $R^1$ is preferably an alkyl group with at least 3 and preferably at least 5 C atoms.

$R^1$ in formula I preferably denotes a hydrogen atom and n represents numbers from 2 to 10 and especially 2 to 4. In the meaning of alkyl, $R^1$ can be methyl, ethyl, propyl, n-butyl, i-butyl, pentyl, hexyl, octyl, nonyl, decyl or dodecyl.

$R^2$ is preferably methyl and $R^3$, $R^4$ and $R^5$ are methyl or ethyl. $m$ in formula IIb is preferably 0 or the number 4. X in formula I is, in particular, a radical of the formula IIa in which $R^2$ and $R^3$ in particular denote methyl.

The dicarboxylic acids of the formula I and the derivatives thereof which form polyesters are new and can be manufactured by reacting 1 mol of the compounds of the formulae IIa to IIf, the free valencies of which have been saturated with hydrogen atoms, (benzimidazolone, chlorinated or brominated benzimidazolone, parabanic acid, 2,2-dimethylimidazollidine-4,5-dione, barbituric acid which is alkylated or phenylated in the 5-position, 6-methyl-uracil and methylene-bis-hydantoin alkylated in the 5-position) or the disodium salts or dipotassium salts thereof, with 2 mols of an ω-halogenocarboxylic acid of the formula III

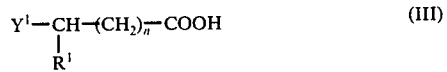

or mixtures of compounds of the formula III, in which $R^1$ and n have the same meaning as in formula I and $Y^1$ represents a chlorine atom or bromine atom, to give compounds of the formula I, 2 mols of hydrogen chloride or hydrogen bromide or of sodium chloride or sodium bromide or of potassium chloride or potassium bromide being split off.

Halogenocarboxylic acids of the formula III in which $R^2$ represents an alkyl group or, optionally, a hydrogen atom can be manufactured by an addition reaction of HBr or HCl with mono-unsaturated aliphatic monocarboxylic acids and subsequent esterification if appropriate, the corresponding halogenocarboxylic acids or mixtures of isomeric halogenocarboxylic acids being formed, depending on the position of the double bond in the unsaturated monocarboxylic acid and on the mechanism by which the addition reaction takes place (Markownikoff's rule). Thus, for example, an addition reaction of HBr with oleic acid or elaidic acid gives a mixture of isomers consisting of 8-bromo- and 9-bromostearic acid. In the same way, a mixture of isomers consisting of 12-bromo- and 13-bromo- behenic acid is obtained by adding on HBr to erucic acid or brassidic acid.

If, in place of the carboxylic acids of the formula III, the alkyl esters or phenyl esters thereof are used, the dicarboxylic acid diesters are correspondingly obtained. The dicarboxylic acids of the formula I can be converted into the dicarboxylic acid dichlorides by halogenation with known halogenating agents, such as phosphorus pentachloride.

As a rule, the conversion reaction is carried out in an organic solvent, the halogen-containing compounds of the formula III preferably being employed in a slight molar excess. It is also possible to carry out the conversion reaction without a solvent, that is to say in the melt.

Examples of solvents which can be used are: dimethylformamide, dimethylacetaide, dimethylsulphoxide, N-methylpyrrolidone, tetramethylurea, benzene, toluene, xylene, chloroform and mixtures of such solvents.

The reaction, which proceeds with the elimination of hydrogen halide, is appropriately carried out in the presence of an acid acceptor, which is added to the solvent in amounts which at least correspond to the equivalent amount, relative to the calculated amount of hydrogen halide liberated. Acid acceptors suitable for this purpose are, in particular, potassium carbonate, sodium carbonate and calcium carbonate, sodium bicarbonate and also sterically hindered amines, such as N-methylaniline, dimethylaniline and diazabicyclooctane, or also pyridine, tetramethyl-ammonium hydroxide, alkali metal halides and alkaline earth metal halides. The conversion reactions are carried out in the temperature range of 20° to 200° C and preferably of 50° to 150° C, the reaction temperatures to be chosen depending on the nature of the starting materials, on the composition of the solvent mixture and on the nature of the acid acceptors.

In order to isolate the reaction product, the reaction solution is filtered hot in order to remove, for example, the potassium halide which is formed when potassium carbonate is used as the acid acceptor, and the desired product is obtained by allowing it to crystallise out of the reaction solution or by pouring the reaction solution into water in order to effect precipitation or by concentrating the reaction solution to dryness and recyrstallising the crude product from an organic solvent. Various organic solvents, such as, for example, methanol, acetone, ethanol or tetrahydrofurane, are suitable for this purpose.

The polyesters according to the invention are obtained according to known processes by subjecting the dicarboxylic acids, or the derivatives thereof which form polyesters, to a polycondensation reaction with at least one diol containing aliphatic alcohol groups, at temperatures of 50° to 320° C, under normal pressure, in vacuo and/or in a stream of an inert gas, until the desired viscosity is reached.

The known processes for the manufacture of the new polyesters are, for example, solution condensation or azeotropic condensation, interfacial condensation, melt condensation or solid phase condensation as well as combinations of these methods, depending on which polyester-forming derivatives and reaction cataysts are used.

In the main, the low-molecular dialkyl esters with 1 to 4 carbon atoms in the molecule, preferably the dimethyl esters or diphenyl esters, are used as polyester-forming derivatives of the dicarboxylic acids. Furthermore, the acid dihalides, especially the acid dichlorides, and the mixed anhydrides of the dicarboxylic acids and low-molecular aliphatic monocarboxylic acids are also suitable.

The polyesters according to the invention can be manufactured by esterifying one or more dicarboxylic acids, or transesterifiying the low-molecular dialkyl esters thereof, at 150°–250° C with diols containing aliphatic alsohol groups, in an inert atmosphere, for example a nitrogen atmosphere, in the presence of catalysts and with simultaneous removal of the water or alkanol formed, and subsequently carrying out the polycondensation reaction at 200° to 320° C and under reduced pressure in the presence of specific catalysts until the polycondensation products have the desired viscosity. After it has been removed from the reaction vessel and cooled, the resulting polyester melt is graulated or cut into chips in the customary manner.

Esterification catalysts which, in a known manner, it is possible to use are amines and inorganic or organic acids, for example hydrochloric acid or p-toluenesulphonic acid, or, alternatively, metals or metal compounds which are also suitable as transesterification catalysts.

Since some catalysts preferentially accelerate the transesterification and others preferentially accelerate the polycondensation reaction, a combination of several catalysts is advantageously used. Suitable transesterification catalysts are, for example, the oxides, salts or organic compounds of the metals calcium, magnesium, zinc, cadminum, manganese, titanium and cobalt. The metals themselves can also be used as catalysts. The polycondensation reaction is catalysed, for example, by metals such as lead, titanium, germanium and, in particular, antimony or tin, and the compounds thereof. These catalysts can be added together or separately to the reaction mixture. These catalysts are employed in amounts of about 0.001 to 1.0 percent by weight, relative to the acid component.

Those catalysts which accelerate both the transesterification and the polycondensation reaction are particularly advantageously used for the manufacture of the polyesters according to the invention. Catalysts of this type which can be used are, above all, mixtures of different metals or metal compounds as well as corresponding metal alloys.

Another process for the manufacture of the new polyesters consists in subjecting one or more dicarboxylic acid dihalides, preferably the acid dichlorides, to a polycondensation reaction with diols containing aliphatic alcohol groups, in the presence of a basic catalyst, in the temperature range of 0° to 100° C and with the elimination of hydrogen halide. Basic catalysts which are used are, preferably, amines or quaternary ammonium salts. The proportion of basic catalyst can be 0.1 to 100 mol %, relative to the acid halides. This process can also be carried out without a solvent or in the presence of a solvent.

The polycondensation reaction can also be carried out by first subjecting the starting compounds to a condensation reaction in the melt until a certain viscosity is reached, then granulating the precondensate, manufactured in this way, for example with the aid of an underwater granulator, drying the granules and then subjecting them to a solid phase condensation reaction, for which vacuum and temperatures below the melting point of the granules are used. Higher viscosities can be achieved in this way.

Inert additives of all types, such as, for example, fillers, such as kaolin, metal powders, wollastonite and, in particular, glass fibres, inorganic or organic pigments, optical brighteners, matting agents, mould release agents, agents which promote crystallisation and flameproofing agents, can be added to the reaction mixture during working-up of the polyester melt or even prior to the polycondensation reaction.

If the polycondensation reaction is carried out discontinuously, the inert additives can already be added during the final condensation steps, for example during the solid phase condensation reaction, or at the end of the melt condensation reaction.

The polyesters according to the invention can be partially crystalline or amorphous, depending on which diols and which dicarboxylic acids are used as the starting component and the ratios in which these are employed. The polyesters are colourless to brown in colour and are thermoplastic materials (engineering plastics), from which mouldings with valuable properties can be manufactured by the conventional shaping processes such as casting, injection moulding and extruding. Examples of such mouldings are components of technical apparatuses, apparatus casings, househould appliances, sports equipment, electrical insulation, car components, circuits, sheets, films and semi-finished goods, which can be shaped by machining. It is also possible to use the polyesters for coating articles by known powder-coating processes. Furthermore, the polyesters according to the invention are also suitable as hot-melt adhesives.

The stability of the polyesters according to the invention to heat is surprisingly high, so that only a slight thermal degradation is observed with the known processing methods and possible discolorations, associated with such degradation, of the polyester virtually do not arise.

The copolyesters according to the invention are outstandingly suitable for specific applications of all kinds since the spectrum of properties of the base polymers can frequently be so modified in a desired manner that many properties are essentially retained and only specific properties are improved. A particular surprising advantage is that these desired modifications can already be achieved when relatively small amounts of the dicarboxylic acids of the formula I are cocondensed into the polyesters. Surprisingly, the notched impact strength is improved, compared with the base polymer, without this resulting in a substantial lowering of the glass transition temperature and this opens up a wider range of application for the base polymer. In addition to the lowering of the melting point or softening point, which results in advantages during processing, the modulus of elasticity is also lowered, so that the copolyesters are also more flexible.

The polyesters manufactured according to the examples which follow are characterised in more detail by the following characteristics. The polyesters are characterised by those morphological changes which are measured by means of differential thermal analysis on a sample which has been subjected to heat treatment for 3 minutes at a temperature which is 30° C above the melting point or the softening point and then rapidly chilled. The sample which has been rapidly chilled is heated at a heating rate of 16° C/minute by means of the "DSC-1B" differential scanning calorimeter from Messrs. Perkin-Elmer. The thermogram of the sample shows the glass transition temperature ($T_g$), the crystallisation temperature ($T_c$) and the crystallite melting point ($T_m$).

The glass transition temperature is given as the point of inflexion at the sudden rise in the specific heat in the thermogram, the crystallisation temperature is given as the apex of the exothermic peak, the melting point is given as the apex of the endothermic peak and the decomposition temperature ($T_d$) is given as that point at which the sudden exothermic and endothermic variations in the specific heat start. The relative viscosity of the polycondensation products of the examples is determined at 30° C on solutions of 1 g of polyester in 100 ml of a mixture consisting of equal parts of phenol and symmetrical tetrachloroethane. The softening point ($T_s$) is determined using a Kofler heated stage microscope, at a heating rate of 15° C/minute, a cross being formed from 2 filaments and the softening point being defined as that temperature at which the sharp angles of the cross disappear.

EXAMPLE 1

Copolyethylene terephthalate (Co-PET) containing 5 mol % of
1,1'-methylene-bis-[3-(3'-carbomethoxy-n-propyl)-5,5-dimethylhydantoin] (A)

A mixture of 34.96 g of dimethyl terephthalate (DMT, 0.18 mol), 9.37 g (0.02 mol) of 1,1'-methylene-bis-[3-(3'-carbomethoxy-n-propyl)-5,5-dimethylhydatoin] and 33.5 g (0.54 mol) of ethylene glycol is transesterified at 160° C to 200° C, in the course of 1.5 hours, under the action of a catalyst mixture consisting of 0.03 g of calcium acetate, 0.04 g of zinc acetate and 0.02 g of manganese-II acetate, the methanol formed being removed by distillation.

0.1 g of antimony trioxide is then added and the polycondensation reaction which now follows is carried out in the following way: 2 hours/200° – 245° C/normal pressure, $N_2$ atmosphere, 45 minutes/245° – 285° C/200 mm Hg — 15 mm Hg/$N_2$ and 40 minutes/285° – 295° C/15 mm Hg to 0.2 mm Hg/$N_2$.

A colourless to pale yellow partially crystalline product which has a relative viscosity of 1.56 and a Kofler softening point of 165° C is obtained in this way.

CHARACTERISTICS $T_g$: 65°–67° C
$T_m$: 224° C
$T_d$: about 360° C.

EXAMPLE 2

Copolybutylene terephthalate (Co-PBT) containing 5 mol % of
1,1'-methylene-bis-[3-(3'-carbomethoxy-n-propyl)-5,5-dimethylhydantoin]

A mixture of 34.96 g (0.18 mol) of DMT, 9.37 g (0.02 mol) of 1,1'-methylene-bis-[3-(3'-carbomethoxy-n-propyl)-5,5-dimethylhydantoin] and 90.1 g (1.0 mol) of 1,4-butanediol is transesterified, and then subjected to a polycondensation reaction, under the catalytic action of 2.4 ml of a 0.02 M solution of tetraisopropyl orthotitanate in n-butanol, as follows: 2 hours/160° – 200° C/normal pressure/$N_2$ atmosphere, 2 hours/200° – 250° C/normal pressure/$N_2$ atmosphere, 1 hour/250° – 270°

C/200 mm Hg to 15 mm Hg/$N_2$ and ½ hour/270° – 285° C/0.5 mm Hg/$N_2$.

For cooling, the hot polyester melt is discharged onto a metal sheet. A colourless, partially crystalline copolyester is obtained, which has the following data.

Kofler softening point: 195° C
$\eta$rel : 2.0
$T_{g:25°}$ C
$T_m$ : 203° C
$T_d$ : about 330° C The $T_g$ values of this copolyester and of pure PBT show virtually no difference.

EXAMPLE 3

Co-PBT containing 12.5 mol % of 1,1'-methylene-bis-[3-(3'-carbomethoxy-n-propyl)-5,5-dimethylhydantoin]

In accordance with Example 2, 29.13 g (0.15 mol) of DMT and 23.43 g (0.05 mol) of 1,1'-methylene-bis-[3-(3'-carbomethoxy-n-propyl)-5,5-dimethylhydantoin], with 90.1 g (1.0 mol) of 1,4-butanediol, are transesterified, and subjected to a polycondensation reaction, under the action of 2.4 ml of a 0.02 M butanolic solution of tetraisopropyl orthotitanate.

This gives a partially crystalline copolyester which has only a slight yellowish discoloration and has the following data:
$\eta$rel = 1.64
$T_g$ = 27° C
$T_m$ = 155° C
$T_d$ = about 310° C

EXAMPLE 4

Co-PBT containing 15 mol % of 1,1'-methylene-bis-[3-(4-carbomethoxy-n-butyl)-5,5-dimethylhydantoin]

In accordance with Example 2, and using the amount of catalyst indicated in that example, 27.19 g (0.14 mol) of DMT, 29.81 g (0.06 mol) of 1,1'-methylene-bis-[3-(4'-carbomethoxy-n-butyl)-5,5-dimethylhydantoin] and 90.1 g (1.0 mol) of 1,4-butanediol are transesterified and then subjected to a polycondensation reaction.

A colourless copolyester which is partially crystalline is isolated in this way.
$\eta$rel = 1.57

EXAMPLE 5

Co-PET containing 5 mol % of 1,1'-methylene-bis-[3-(4'-carbomethoxy-n-butyl)-5,5-dimethylhydanotoin]

Using the catalyst system described in Example 1 and using the procedure described in that Example, 34.96 g (0.18 mol) of DMT, 9.93 g (0.02 mol) of 1,1'-methylene-bis-[3-(4'-carbomethoxy-n-butyl)-5,5dimethylhydantoin] and 33.5 g (0.54 mol) of ethylene glycol are subjected to transesterification and a polycondensation reaction.

This gives a virtually colourless copolyester which is partially crystalline. The material has the following characteristics:
$\eta$rel = 1.87

EXAMPLE 6

Co-PBT containing 12.5 mol % of 1,3-di-(3'-carbomethoxy-n-propyl)-5,5-diethylbarbituric acid A mixture of 29.13 g (0.15 mol) of DMT, 19.22 g (0.05 mol) of 1,3-di-(3-carbomethoxy-n-propyl)-5,5-diethylbarbituric acid and 90.1 g (1.0 mol) of 1,4-butanediol is transesterified, and subjected to a polycondensation reaction, under the catalytic action of 2.4 ml of a 0.02 molar solution of tetraisopropyl orthotitanate (TIPOT) in n-butanol, in accordance with the following instructions: 1 hour/140°–180° C/normal pressure/$N_2$ atmosphere, 1 hour/180°–220° C/normal pressure/$N_2$ atmosphere, 1 hour/220°–240° C/normal pressure/$N_2$ atmosphere, 45 minutes/240°–285° C/200 mm Hg→15 mm Hg/$N_2$ and 25 minutes/285° C/0.2–0.3 mm Hg.

For cooling, the mixture is poured out, under $N_2$, onto a metal sheet. The copolyester thus obtained is partially crystalline and virtually colourless (slight grey tinge) and its relative viscosity is 1.66.

EXAMPLE 7

Co-PBT containing 12.5 mol % of 1,3-di-(3'-carbomethoxy-n-propyl)-2,2-dimethylimidazolidine-4,5-dione A mixture of 11.65 g (0.06 mol) of DMT, 6.57 g (0.02 mol) of 1,3-di-(3'-carbomethoxy-n-propyl)-2,2-dimethylimidazolidine-4,5-dione and 36.04 g (0.4 mol) of 1,4-butanediol is transesteriified, and subjected to a polycondensation reaction, under the catalytic action of 0.9 ml of a 0.02 molar solution of tetraisopropyl orthotitanate in n-butanol, in accordance with the conditions of Example 6. A partially crystalline, slightly coloured Co-PBT which has a relative viscosity of 1.33 is isolated.

EXAMPLE 8

Co-PBT containing 12.5 mol % of 1,3-di-(3'-carbomethoxy-n-propyl)-benzimidazolone The mixture indicated below is subjected to transesterification, and a polycondensation reaction, in accordance with Example 6, 2.4 ml of a 0.02 molar solution of tetraisopropyl-orthotitanate in 1-butanol being used as the catalyst. 29.13 g (0.15 mol) of DMT, 16.72 g (0.05 mol) of 1,3-di-(3'-carbomethoxy-n-propyl)-benzimidazolone and 90.1 g (1.0 mol) of 1,4-butanediol.

A virtually colourless copolyester which is partially crystalline and has a relative viscosity of 1.30 is obtained.

EXAMPLE 9

Co-PBT containing 8.4 mol % of 1,1'-methylene-bis-[3-(3'-carbomethoxy-n-propyl)-5,5-dimethylhydantoin]

97 g of dimethyl terephthalate, 46.9 g of 1,1'-methylene-bis-[3-(3'-carbomethoxy-n-propyl)-5,5-dimethylhydantoin] and 90 g of butane-1,4-diol, as well as 0.02% (relative to the sum of the acid components) of titanium tetraisopropylate are filled into a 2 liter reactor fitted with a stirrer, a nitrogen inlet, a condenser and a device for measuring the temperature and the mixture is heated to 200° C. 98% of the amount of methanol theoretically to be expected are distilled off, whilst stirring and passing nitrogen through the mixture, the temperature of the reaction mixture rising to 230° C.

A vacuum of 50 mm Hg is then applied in the course of half an hour by means of a water pump and, at the same time, the reaction temperature is raised to 250° C. At a constant reaction temperature, the vacuum is increased to 0.7 mm Hg in the course of half an hour, using a vacuum pump, and is maintained at this level for a further 3 hours.

Nitrogen is admitted to the reactor before the latter is opened. A polyester with the following characteristics is obtained:

$\eta$rel : 2.62
$T_m$ : 199° C

EXAMPLE 10

Homopolyester of 1,1'-methylene-bis-[3-(3'-carbomethoxy-n-propyl)-5,5-dimethylhydantoin] and ethylene glycol 117 g of 1,1'-methylene-bis-[3-(3'-carbomethoxy-n-propyl)-5,5-dimethylhydantoin] and 46.5 g of ethylene glycol, as well as 0.037 g of zinc acetate and 0.066 g of $Sb_2O_3$ as catalysts, are filled into a 2 liter reactor fitted with a stirrer, a nitrogen inlet, a condenser and a device for measuring the temperature and the mixture is heated to 200° C. 98% of the amount of methanol theoretically to be expected are distilled off, whilst stirring and passing nitrogen through the mixture, the temperature of the reaction mixture rising to 240° C.

A vacuum of 50 mm Hg is then applied in the course of half an hour by means of a water pump and, at the same time, the reaction temperature is raised to 260° C. At a constant reaction temperature, the vacuum is increased to 0.7 mm Hg in the course of half an hour, using a vacuum pump, and is maintained at this level for a further 2.5 hours.

Nitrogen is admitted to the reactor before the latter is opened. A polyester which has the characteristics listed in the table which follows is obtained:

$\eta$rel : 2.76
$T_s$ : 140
$T_g$ 51° C

EXAMPLES 11 – 29

The polyesters listed in Table 1 which follows are prepared in accordance with Example 9 (if butanediol is used) or Example 10 (if ethylene glycol is used).

Table 1

| Example No. | Composition (acids and diol) | Molar ratio | $\eta_{rel}$ | $T_g$ (° C) | $T_s$ (° C) |
|---|---|---|---|---|---|
| 11 | TPA + B + B 14 | 0.45 : 0.05 : 0.5 | 2.08 | 42 | 204+ |
| 12 | TPA + A + succinic acid + B 14 | 0.35 : 0.1 : 0.05 : 0.5 | 2.62 | 31 | 160+ |
| 13 | TPA + A + IPA + EG | 0.15 : 0.25 : 0.1 : 0.5 | 2.00 | 60 | 110 |
| 14 | TPA + A + azelaic acid + B 14 | 0.2 : 0.2 : 0.1 : 0.5 | 2.67 | 23 | 105 |
| 15 | TPA + A + adipic acid + B 14 | 0.4 : 0.05 : 0.05 : 0.5 | 2.70 | 26 | 187+ |
| 16 | TPA + A + PA + B 14 | 0.35 : 0.05 : 0.1 : 0.5 | 2.10 | 26 | 115 |
| 17 | TPA + C + EG + NPG | 0.4 : 0.1 : 0.3 : 0.2 | 2.25 | 38 | 115 |
| 18 | TPA + D + B 14 | 0.4 : 0.1 : 0.5 | 1.95 | 48 | 181+ |
| 19 | TPA + A + EG + hexanediol | 0.25 : 0.25 : 0.25 : 0.25 | 2.14 | 42 | 100 |
| 20 | TPA + A + EG + DEG | 0.35 : 0.15 : 0.3 : 0.2 | 2.04 | 51 | 110 |
| 21 | TPA + A + EG + propane-1,2-diol | 0.4 : 0.1 : 0.35 : 0.15 | 1.99 | 59 | 120 |
| 22 | C + NPG | 0.5 : 0.5 | 2.83 | −5 | 100 |
| 23 | C + Dianol 22 | 0.5 : 0.5 | 2.63 | 22 | 95 |
| 24 | TPA + C + B 14 | 0.45 : 0.05 : 0.5 | 2.34 | 20 | 205+ |
| 25 | TPA + C + B 14 | 0.4 : 0.1 : 0.5 | 2.75 |  | 179+ |
| 26 | TPA + D + B 14 | 0.45 : 0.05 : 0.5 | 2.42 | 21 | 200+ |
| 27 | TPA + E + B 14 | 0.4 : 0.1 : 0.5 | 2.23 | 20 | 177+ |
| 28 | B + EG | 0.5 : 0.5 | 1.38 | 85 | 120 |
| 29 | B + B 14 | 0.5 : 0.5 | 1.38 | 63 | 110 |

Abbreviations in Table 1

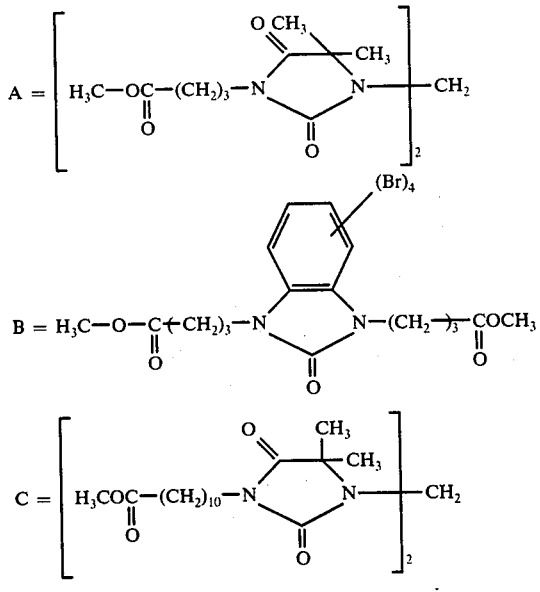

Table 1-continued

| Example No. | Composition (acids and diol) | Molar ratio | $\eta_{rel}$ | $T_g$ (°C) | $T_s$ (°C) |
|---|---|---|---|---|---|

$$D = -CH_2 - \left[ -N \underset{\underset{O}{\overset{\|}{C}}}{\overset{CH_3\ \ CH_3}{\overset{|\ \ \ |}{\underset{|}{C} - \underset{|}{C}}}} \underset{(CH_2)_{11}}{\overset{O}{\underset{|}{N - \overset{H}{\underset{|}{C}} - \overset{\|}{\underset{|}{C}} - OCH_3}}} \right]_2$$

$$E = CH_2 - \left[ -N \underset{\underset{O}{\overset{\|}{C}}}{\overset{CH_3\ \ CH_3}{\overset{|\ \ \ |}{\underset{|}{C} - \underset{|}{C}}}} \underset{CH_3}{\overset{CH}{\underset{|}{}}} \underset{}{\overset{O}{N - (CH_2)_3 - \overset{\|}{C} - OC_4H_9}} \right]_2$$

DA = dimeric acid
TPA = terephthalic acid
IPA = isophthalic acid
PA = phthalic anhydride
NPG = neopentylglycol
CHDM = 1,4-cyclohexanedimethanol
DEG = diethylene glycol
EG = ethylene glycol
B 14 = butane-1,4-diol
+ = crystallite melting point (DTA)

EXAMPLES 30 - 31

Analogously to Example 9, PBT copolyesters are manufactured using the dicarboxylic acids and B and are injection-moulded to give standard small bars and the following mechanical properties are tested:

| Example No. Property | Test Standard | 30 PBT, 5 mol % of C | 31 PBT, 10 mol % of C |
|---|---|---|---|
| $\eta_{rel}$ (granules) | | 2.53 | 2.67 |
| $\eta_{rel}$ (standard small bars) | | 2.47 | 2.52 |
| Flexural strength kp/cm² | DIN 53,452 | 415 | 140 |
| Modulus of elasticity kp/cm² | DIN 53,452 | 9,500 | 1,900 |
| Impact strength cmkp/cm² | DIN 53,453 | no break | no break |
| Notched impact strength cmkp/cm² | DIN 53,453 | 18.5 | no break |

EXAMPLE 32

Co-PET containing 15 mol % of F

The following mixture is transesterified for 2 hours under the action of 0.04 g of calcium acetate + 0.05 g of zinc acetate + 0.02 g of manganese-II acetate, at 150°-200° C, whilst distilling off methanol: 27.13 g (0.14 mol) of dimethyl terephthalate, 39.89 g (0.06 mol) of 1,1'-methylene-bis-[3-(10'-carbomethoxydecyl)-5,5-dimethylhydantoin] and 33.50 g (0.54 mol) of ethylene glycol.

0.1 g of antimony trioxide is then added and the polycondensation reaction is started, ethylene glycol being split off and distilled off, by heating the mixture to 240° C in the course of 2 hours. A vacuum is then applied and the temperature is further raised: 45 minutes/240°→290° C/200 mm Hg→15 mm Hg and 30 minutes/290° C/15 mm Hg→0.22 mm Hg.

A coloured, transparent, very tough copolyester which becomes partially crystalline on stretching is obtained.

The amorphous product softens at 50° C and has a relative viscosity (phenol/tetrachloroethane, 30° C) of 2.03.

Glass transition range: 15° – 29° C
Crystallite melting point: 168° – 171° C
Decomposition temperature: about 350° C The product is processed in the customary manner, by means of a screw injection moulding machine, to give standard small bars which have the following properties:

Impact strength (DIN 53,453): no break
Tensile strength (DIN 53,455): 35 kp/cm²
Elongation at break (DIN 53,455): 288%

The measured values show that this copolyester has a very high toughness which, with the incorporation of only 15 mol % of comonomer into PET, already leads into the ranges of the elastoplastics. Thus, copolymers which have desirable flexibility, elasticity and toughness properties and can be processed easily can be obtained according to the invention.

EXAMPLE 33

Co-PET containing 10 mol % of
4,4'-bis-[3-(5-carbomethoxy-n-pentyl)-hydantoin-1-yl]-diphenylmethane (compare DOS 1,906,492 and 2,358,437)

A mixture of 11.65 g (0.06 mol) of DMT, 11.50 g (0.2 mol) of EG and 9.73 g of 4,4'-bis-[3-(5-carbomethoxy-n-pentyl)-hydantoin-1-yl]-diphenylmethane is transesterified, and subjected to a polycondensation reaction, under the catalytic action of 0.01 g of calcium acetate, 0.015 g of zinc acetate, 0.007 g of manganese-II acetate and 0.04 g of antimony trioxide, as follows: 2 hours/130°→200° C/N₂/normal pressure, 2 hours/200°→240° C/N₂/normal pressure, 35 minutes/240°→280° C/90 mm Hg→14 mm Hg and 30 minutes/280° C/0.2→0.3 mm Hg.

The desired copolyester is obtained in the form of a black-brown, amorphous product which softens at 74° C and has a relative viscosity of 2.17.

CHARACTERISTICS:

Glass transition range 63°–75° C

The product is amorphous, no crystallite melting point can be determined using a differential scanning calorimeter Decomposition temperature: about 350° C The product is processed in the customary manner to give standard small bars which have the following properties and the following property is measured: impact strength (DIN 53,453) 8.7 Kp.cm/cm²

These results show that this copolyester is not suitable for applications in which high toughness at room temperature is required. This can also already be seen from the fact that the $T_g$ value is virtually only slightly changed compared with that of pure PET. If and when larger amounts of this monomer are incorporated, which, moreover, is more difficult to carry out, than is the case with the products according to the invention, it is not possible to obtain any copolyesters which have the properties of elastoplastics.

EXAMPLE 34

Co-PET containing 15 mol % of 1,3-di-(carbomethoxy-n-propyl)-5-phenyl isocyanurate (compare U.S. Pat. No. 3,928,343 and U.S. Pat. No. 3,957,778)

Under the catalytic action of a mixture of 0.04 g of calcium acetate, 0.05 g of zinc acetate, 0.02 g of manganese-II acetate and 0.1 g of antimony trioxide, 27.19 g (0.14 mol) of DMT, 33.5 g (0.54 mol) of EG and 26.0 g (0.06 mol) of 1,3-di-(3-carbomethoxy-n-propyl)-5-phenylisocyanurate prepared in accordance with Journal Pol. Sci., Pol-Chem.Ed.12 (1974), 1741 (B.VII) are transesterified, and subjected to a polycondensation reaction, as follows: 2 hours/150°→210° C/N₂/normal pressure, 2 hours/210°→240° C/N₂/normal pressure, 45 minutes/240° C→280° C/200 mm Hg→15 mm Hg and 40 minutes/240° C→290° C/0.2 mm Hg.

A dark brown, amorphous copolyester which softens at 100° C and has a relative viscosity of 1.90 is obtained.

Glass transition 65°–80° C

Decomposition temperature about 340° C

The polyester is processed in the customary manner to give standard small bars which have the following properties:

Impact bending strength (DIN 53,453): 4.0 Kpcm/cm²

Modulus of elasticity (VSM 77,103): 22,500 Kp/nm²

This comparison copolyester which is based on PET is thus also not tough and flexible but is to be designated as hard and brittle.

What is claimed is:

1. A linear thermoplastic polyester, obtained from aromatic and aliphatic dicarboxylic acids and diols, which has a relative viscosity of 1.2 to 3.5, measured at 30° C in a solution of 1 g of polyester in 100 ml of a solvent which consists of equal parts of phenol and symmetrical tetrachloroethane, which contains, relative to the polyester, (a) 0 to 49.5 mol % of radicals of at least one aliphatic and/or aromatic dicarboxylic acid, (b) 50 to 0.5 mol % of radicals of at least one dicarboxylic acid of the general formula I

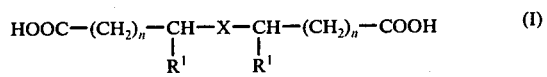

in which the two $R^1$ independently of one another each denote a hydrogen atom or alkyl with 1 to 12 C atoms, n represents identical or different numbers from 0 to 12, the C content of the $(CH_2)_n$ and $R^1$ groups together being at least 2, and X denotes a N,N-heterocyclic radical of the formulae IIa to IIf

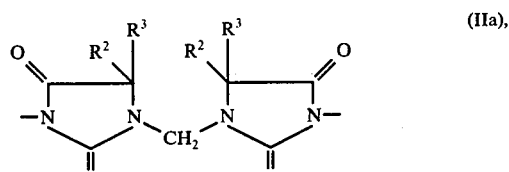

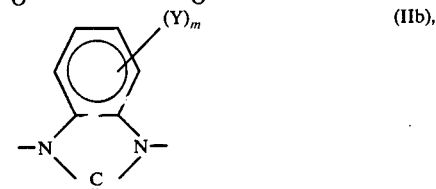

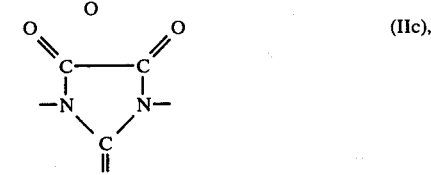

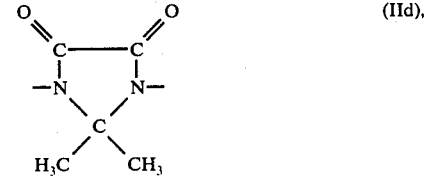

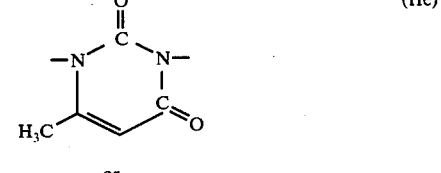

or

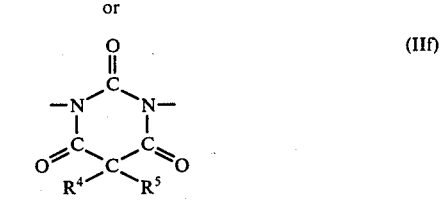

in which $R^2$ represents a hydrogen atom or the methyl or ethyl group and $R^3$ represents the methyl, ethyl, propyl or isopropyl group, $R^4$ and $R^5$ each denote the methyl, ethyl or phenyl group, Y represents a bromine atom or chlorine atom and m is nought or denotes a number from 1 to 4, and (c) 50 mol % of radicals of at least one aliphatic or cycloaliphatic diol, as cocondensed radicals.

2. A polyester according to claim 1, wherein the radicals of the dicarboxylic acids of component (a) consist to the extent of at least 85 mol % of aromatic dicarboxylic acid radicals, relative to the dicarboxylic acid radicals present in component (a).

3. A polyester according to claim 2, wherein the aromatic dicarboxylic acid radicals are terephthalic acid radicals.

4. A polyester according to claim 1, which contains 30 to 49 mol % of dicarboxylic acid radicals of component (a) and 20 to / mol % of dicarboxylic acid radicals of component (b).

5. A polyester according to claim 1, which contains, as diol radicals of component (c), radicals of an alkylenediol with 2 to 10 carbon atoms, 1,4-cyclohexanediol radicals, 1,4-cyclohexanedimethanol radicals or diol radicals of the formula III

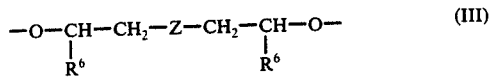

in which $R^6$ denotes methyl, ethyl or a hydrogen atom and Z represents a radical of the formulae IIa or IIb or represents a hydantoin radical of the formula IIg

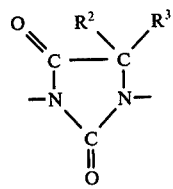

in which $R^2$, $R^3$, Y and m have the meaning previously indicated.

6. A polyester according to claim 5 which contains at least 40 mol % of linear alkylenediol radicals with 2 to 4 C atoms.

7. A polyester according to claim 1, wherein $R^1$, in its meaning of alkyl, contains 1 to 10 C atoms and n represents numbers from 2 to 12.

8. A polyester according to claim 1, wherein $R^1$ denotes a hydrogen atom and n represents identical numbers from 2 to 10

9. A polyester according to claim 1, wherein $R^2$ denotes methyl and $R^3$ denotes methyl or ethyl and $R^4$ and $R^5$ represent methyl or ethyl.

10. A polyester according to claim 1, wherein m, in the formula IIb, is nought or denotes the number 4.

11. A shaped article made from a polyester according to claim 1.

12. A polyester according to claim 4 which contains 40 to 48 mol% of dicarboxylic acid radicals of component (a) and 10 to 2 mol% of dicarboxylic acid radicals of component (b).

13. A polyester according to claim 5 wherein the diol radicals of component (c) are radicals of an alkylenediol with 2 to 4 carbon atoms.

14. A polyester according to claim 8 wherein $n$ represents identical numbers from 2 to 4.

* * * * *